Patented Sept. 11, 1934

1,972,873

UNITED STATES PATENT OFFICE 1,972,873

AZO DYE AND METHOD FOR ITS PREPARATION

Miles A. Dahlen, Wilmington, Del., and Martin E. Friedrich, Carneys Point, N. J., assignors to E. I. du Pont de Nemours & Company, Wilmington, Del., a corporation of Delaware No Drawing. Application March 30, 1933, Serial No. 663,550

12 Claims. (Cl. 260—95)

This invention relates to insoluble azo dyes and more particularly refers to monoazo dyes which are commonly termed "ice colors".

In its preferred form the subject matter of the present invention comprises monoazo dyes of the following general formula:

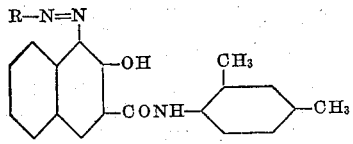

wherein R represents the residue of a halogenated amino-benzene, preferably a chloro-amino-benzene.

The halogeno-amino-benzene grouping may have substituted thereon additional groups, for example, halogen, alkyl, alkoxy, aryloxy, nitro and trifluoromethyl. This halogenated aminobenzene nucleus should have no water solubilizing groups such as the carboxyl or sulfonic acid groups substituted thereon.

It is well known that water insoluble azo pigments and dyestuffs may be prepared by the coupling of d'azotized aromatic amines, free from solubilizing groups, with the arylamides of 2-3-hydroxy-naphthoic acid. In producing these so-called "ice colors" there are instances where the meta-xylidide of 2-3-hydroxy-naphthoic acid was selected as the coupling component. Likewise there are other instances where the d'azo salt was the residue of a halogenated amino-benzene. However, the use of a halogenated amino-benzene in conjunction with the meta-xylidide of 2-3-hydroxy-naphthoic acid has never, so far as we are aware, been attempted or suggested.

This particular configuration is especially adapted for use in the "one-bath" method of dyeing, where colors are produced on the fiber from mixtures containing water soluble d'azoimino compounds, or nitrosamines prepared from the arylamines, with ice color coupling components. Such mixtures show surprisingly good solubility, thoroughly impregnate textile fibers, and the ice color may be readily generated therefrom.

It is an object of the present invention to produce water insoluble azo dyes and pigments. A further object is to produce monoazo dyes having bright attractive shades of satisfactory fastness. A still further object is to impart these shades directly to the textile material by the recent "one-bath" processes. An additional object is to produce printing compositions which are especially suitable for use in the "one-bath" process. Additional objects will become apparent by a consideration of the following description.

These objects are attained according to the herein described invention, which in its preferred form comprises diazotizing a chloro-amino-benzene and coupling the resulting diazo salt with the meta-4-xylidide of 2-3-hydroxy-naphthoic acid. As previously mentioned, the chloro-amino-benzene nucleus may have substituted thereon groups such as halogen, alkyl, alkoxy, nitro, aryloxy, and trifluoromethyl. This nucleus should be free from substitutents which render the resulting dyestuff water soluble, for instance the carboxylic or sulfonic acid groups.

According to our invention the dyes may be produced in aqueous solution or suspension, in which case they are obtained as pigments; alternatively, they may be produced directly on the textile fiber, preferably cotton or regenerated cellulose. When producing these dyes directly on the fiber the customary processes of the prior art may be utilized. For example, the fiber may be impregnated with the meta-xylidide, and then dyed or printed with the diazotized arylamine. The arylamine may be converted to a nitrosamine, and the fiber impregnated with the mixture of the nitrosamine and the meta-xylidide of 2-3-hydroxy-naphthoic acid, development being effected by the use of acidic reagents. The arylamine may be converted to a water soluble diazoimino compound, the fiber impregnated with a mixture of this diazoimino compound and the meta-xylidide of 2-3-hydroxy-naphthoic acid, development subsequently taking place by subjecting the impregnated material to the action of live steam containing acetic acid.

A more complete understanding of the invention may be attained by a consideration of the following illustrative examples, in which the quantities are stated in parts by weight:

Example 1

2-5-dichloroaniline was diazotized and converted to the nitrosamine (sodium salt of the anti-diazotate) as described in U. S. P. 531,975. The crude product was dissolved in hot water, and re-precipitated by the addition of sodium chloride. The purified material was filtered and dried. The dried product showed a purity of 80.7 per cent (based on a molecular weight of 213).

A printing powder was prepared by mixing mechanically 10.5 parts of the nitrosamine obtained as above and 11.6 parts of the meta-4-xylidide of 2-3-hydroxy-naphthoic acid. A printing paste was prepared from this powder according to the following formula:

| | Parts |
|---|---|
| Mixture obtained above | 8 |
| Ethyl alcohol | 8 |
| Caustic soda of 30% strength | 2 |
| Water | 14 |
| Sodium chromate | 3 |
| Thickener | 65 |
| | 100 |

Cotton piece goods were printed with the above paste, steamed, and the color developed by immersing the cloth for 45 seconds at 140° F. in a solution containing 0.5% sodium bichromate and 0.5% of glacial acetic acid. The goods were then rinsed, soaped at the boil, again rinsed, and dried.

The pattern was developed as a bright scarlet dyeing, of excellent fastness to light, washing, chlorine and kier boiling, due to the formation on the fiber of the dyestuff of the probable formula:

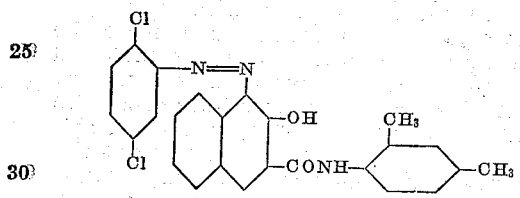

*Example 2*

42.6 parts of 4-chloro-2-amino-toluene were added to a solution of 30 parts of hydrochloric acid (37% by weight) in 100 parts of water. The mixture was heated to effect complete solution, then an additional 54 parts of 37% hydrochloric acid were added. The mass was cooled to 5° C., and the base diazotized by the addition of 21 parts of sodium nitrite dissolved in 50 parts of water, ice being added as required to maintain a temperature of 5–8° C. during the diazotization. The diazo solution was filtered to remove small quantities of insoluble matter.

41 parts of the sodium salt of piperidine-A-carboxylic acid were dissolved in about 300 parts of water containing 23 parts of sodium carbonate. The solution was cooled to 8° C., and the diazo solution obtained as above was then added over a period of about one hour. Additional soda ash was added, as required, to maintain a slight alkalinity to phenolphthalein papers. When formation of the diazoimino compound was complete, as shown by a negative test for free diazo salt, enough sodium chloride was added to form a saturated solution of the latter compound. The diazoimino compound was precipitated as an oil, and was separated from the supernatant liquid. It was dried in a vacuum, yielding a light tan, very hygroscopic powder. The yield was about 90% of the theory. The product had the probable formula:

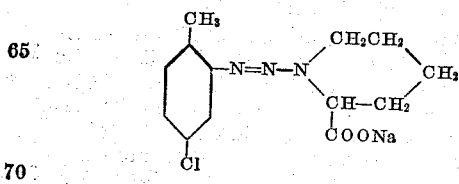

A printing powder was prepared consisting of a mechanical mixture of 35 parts of the diazoimino compound of the above formula and 30 parts of the meta-4-xylidide of 2-3-hydroxy-naphthoic acid.

A printing paste was prepared according to the following formula:

| | Parts |
|---|---|
| Printing powder obtained as above | 2.5 |
| Water heated to 160° F. | 13.5 |
| Caustic soda (40° Bé.) | 1.5 |
| Starch tragacanth thickener | 32.5 |
| | 50.0 |

Cotton piece goods were printed with the above paste from an engraved copper roll, then subjected to the action of live steam containing the vapors of acetic acid. When color development was complete, the goods were rinsed, soaped at the boil, again rinsed and dried. The pattern was developed as a bright red dyeing of excellent fastness to light, washing, chlorine, etc., due to the formation on the fiber of the dyestuff of the probable formula:

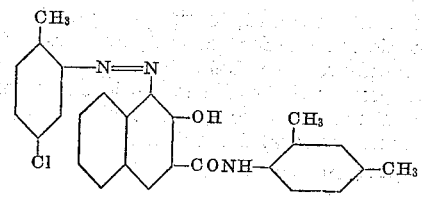

*Example 3*

Cotton piece goods were impregnated in the usual manner in a solution of the meta-4-xylidide of 2-3-hydroxy-naphthoic acid, the "padding bath" having the following composition:

| | Parts |
|---|---|
| The arylamide | 10 |
| Caustic soda (34° Bé.) | 15 |
| Turkey red oil | 10 |
| Water | 1000 |

The padded goods were wrung out, then immersed in the diazo solution obtained according to the following process:

10 parts of 5-chloro-2-amino-toluene were dissolved in 100 parts of boiling water containing 15 parts of hydrochloric acid (22° Bé.). 160 parts of water were then added, the mass cooled to about 10° C., and the base diazotized by the addition of 25 parts of a sodium nitrite solution of 20% strength. Ice was added, as required, to maintain a temperature of 10° C. during the diazotization. 25 parts of sodium acetate were then added to neutralize the mineral acidity.

When color development was complete, the goods were rinsed, soaped at the boil, again rinsed, and dried. The fiber was dyed a bright red, of excellent fastness properties, due to the formation of the dyestuff of the probable formula:

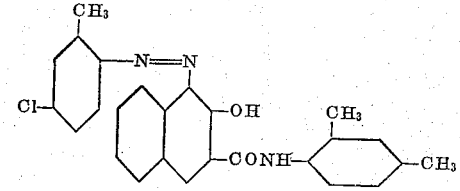

*Example 4*

Cotton piece goods, "padded" with the meta-4-xylidide of 2-3-hydroxy-naphthoic acid as described in the previous example, were immersed in a diazo bath prepared as follows:

12.7 parts of meta-chloro-aniline were stirred to a smooth paste with 24 parts of hydrochloric acid of 22° Bé. strength and 200 parts of water. 150 parts of ice were added, followed by a solution of 8 parts of sodium nitrite in 30 parts of water. When diazotization was complete, the mass was filtered to remove small quantities of insoluble matter. 20 parts of sodium acetate were then added to neutralize the mineral acidity.

When color development was complete, the goods were rinsed, soaped at the boil, again rinsed, and dried. The fiber was dyed to a bright orange, of good fastness to light, soaping, chlorine and kier boiling, due to the formation of the dyestuff of the probable formula:

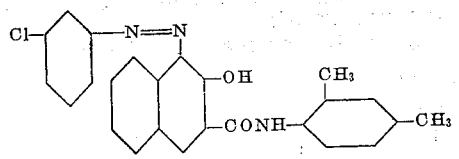

*Example 5*

Well boiled cotton skeins, "padded" with the meta-4-xylidide of 2-3-hydroxy-naphthoic acid according to the process of Example 3, were immersed in a diazo solution prepared as follows:

19.5 parts of X-amino-2-chloro-benzotrifluoride (obtained by the nitration and reduction of 2-chloro-benzotrifluoride) were dissolved in 150 parts of hot water containing 10 parts of hydrochloric acid of 37% strength. An additional 24 parts of the hydrochloric acid was then added, and the mass cooled to 15° C., by the addition of 150 parts of crushed ice and external cooling. The base was then diazotized by the addition of a solution of 7.1 parts of sodium nitrite dissolved in 50 parts of water. When diazotization was complete, the diazo solution was filtered. Sufficient sodium acetate to neutralize the free mineral acidity was then added.

When color development was complete, the skeins were soaped and rinsed as before. The fiber was dyed to a bright orange of excellent fastness to light, due to the formation of the dyestuff of the probable formula:

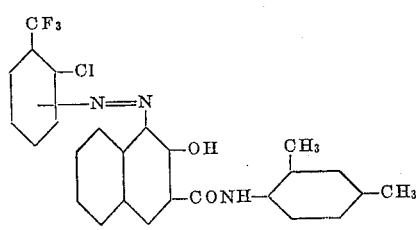

*Example 6*

Cotton piece goods were "padded" with the meta-4-xylidide of 2-3-hydroxy-naphthoic acid as described in Example 3, then developed in a diazo solution prepared as follows:

15.8 parts of 4-chloro-2-amino-anisole were dissolved in 100 parts of water containing 10 parts of hydrochloric acid of 37% strength. An additional 15 parts of the hydrochloric acid was then added, and the solution cooled to 5° C., by the addition of ice. The base was diazotized by the addition of 6.9 parts of sodium nitrite dissolved in 50 parts of water, the temperature being maintained at 5-10° C. during the process. When diazotization was complete, the solution was filtered, and the mineral acidity neutralized by the addition of sodium acetate.

When color development was complete, the goods were rinsed, soaped, rinsed and dried. The fabric was dyed to a bright bluish-red of good fastness properties, due to the formation of the dyestuff of the probable formula:

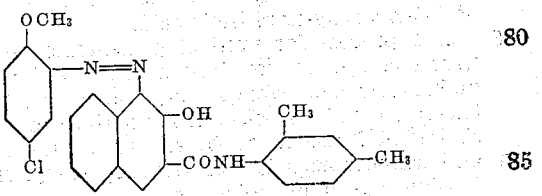

*Example 7*

29 parts of the meta-4-xylidide of 2-3-hydroxy-naphthoic acid were "pasted" with an equal quantity of ethyl alcohol, and 15 parts of caustic soda of 40% strength added. The mass was then diluted with 2000 parts of water.

17 parts of 2-nitro-4-chloro-aniline were dissolved in 30 parts of sulfuric acid of 66° Bé., and the solution diluted with water and ice. The base was diazotized by the addition of a solution of 7.0 parts of sodium nitrite dissolved in 50 parts of water. When diazotization was complete, the solution was filtered. The diazo solution was neutralized with caustic soda solution, the temperature being held below 10° C. during this process. The neutralized diazo solution was then added to the solution of the xylidide prepared as above. When coupling was complete, the insoluble pigment was separated by filtration, washed thoroughly with water, and dried. The product was a dark red powder, which upon recrystallization from glacial acetic acid melted at 284.5-286° C. It dissolved in concentrated sulfuric acid to a deep bluish-red solution, and was precipitated unchanged upon dilution of this solution with water.

It is understood that this invention is susceptible to wide variation and modification in the manner of its practical application. For instance, the products may be produced as pigments, or they may be produced directly on the fiber. When produced on the fiber they are adapted to treatment according to well known processes, several of these processes being described in the examples for purposes of illustration.

Numerous substituted components may be selected for the diazo salt. Among these may be mentioned the halogenated anilines, the chloro-anilines being preferred, the halogenated derivatives of the toluidines,—the xylidines,—the anisidines and phenetidines,—the nitranilines,—the amino-benzotrifluorides,—the amino-diphenyl ethers, etc.

The compounds of the present invention are highly insoluble, and when produced on the fiber impart bright attractive colors of satisfactory fastness thereto. Due to the wide-spread use of the relatively new "one-bath" method of dyeing, compounds of especial adaptability thereto have been much sought after, the compounds disclosed herein possessing this adaptability to a surprising extent.

As many apparently widely different embodiments of this invention may be made without departing from the spirit and scope thereof, it is to be understood that we do not limit ourselves to the specific embodiments thereof except as defined in the appended claims.

We claim:

1. A process for producing insoluble azo dyes which comprises coupling a diazotized halogenated amino-benzene with the meta-4-xylidide of 2-3-hydroxy-naphthoic acid.

2. A process for producing insoluble azo dyes which comprises coupling a diazotized chlorinated amino-benzene with the meta-4-xylidide of 2-3-hydroxy-naphthoic acid.

3. A process for producing insoluble azo dyes which comprises coupling a diazotized chloro-amino-benzene, which may have substituted thereon members selected from the group consisting of halogen, alkyl, alkoxy, aryloxy, nitro and trifluoromethyl, with the meta-4-xylidide of 2-3-hydroxy-naphthoic acid.

4. A process for producing an insoluble azo dye which comprises coupling diazotized 2-5-dichloro-aniline with the meta-4-xylidide of 2-3-hydroxy-naphthoic acid.

5. A process for producing an insoluble azo dye which comprises coupling diazotized 4-chloro-2-amino-toluene with the meta-4-xylidide of 2-3-hydroxy-naphthoic acid.

6. A process for producing an insoluble azo dye which comprises coupling diazotized 5-chloro-2-amino-toluene with the meta-4-xylidide of 2-3-hydroxy-naphthoic acid.

7. Insoluble azo dyes having the following general formula:

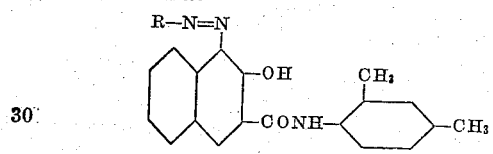

wherein R represents the residue of a halogenated amino-benzene.

8. Insoluble azo dyes having the following general formula:

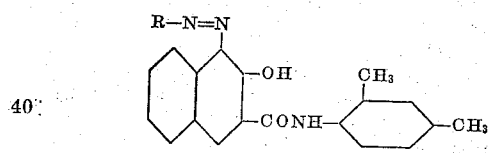

wherein R represents the residue of a chlorinated amino-benzene.

9. Insoluble azo dyes having the following general formula:

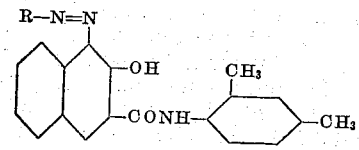

wherein R represents the residue of a chloro-amino-benzene, which may have substituted thereon members selected from the group consisting of halogen, alkyl, alkoxy, aryloxy, nitro and trifluoromethyl.

10. An azo dye having the following formula:

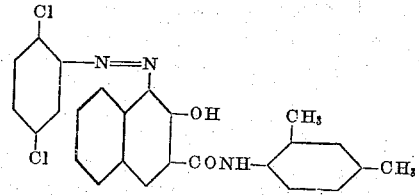

11. An azo dye having the following formula:

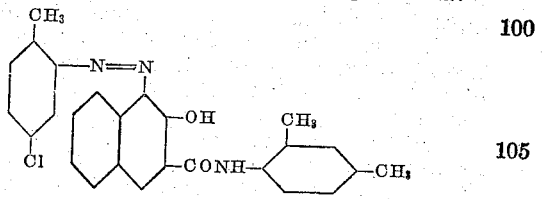

12. An azo dye having the following formula:

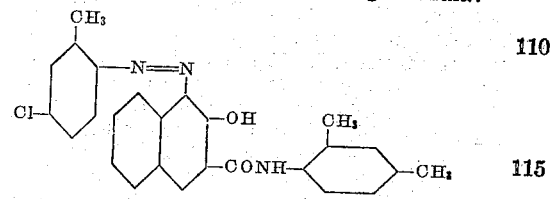

MILES A. DAHLEN.
MARTIN E. FRIEDRICH.